Nov. 6, 1928.
O. C. BARRYMORE ET AL
1,690,849
CONCRETE MIXER WATER CONTROL
Filed May 3, 1927
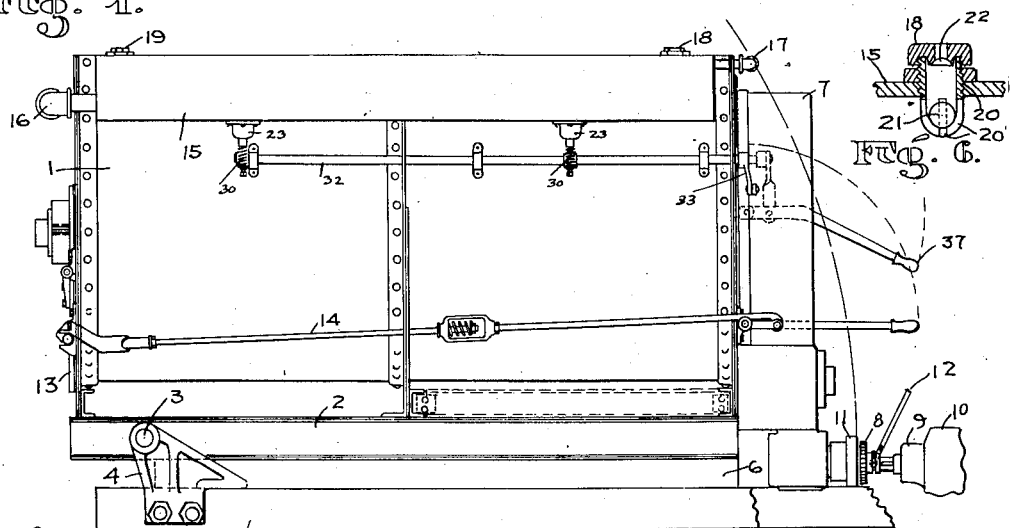
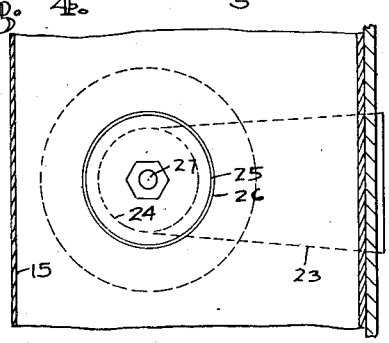
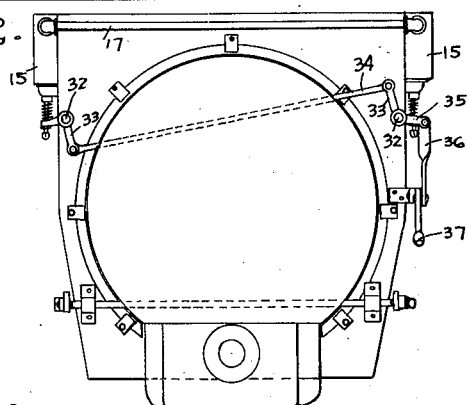
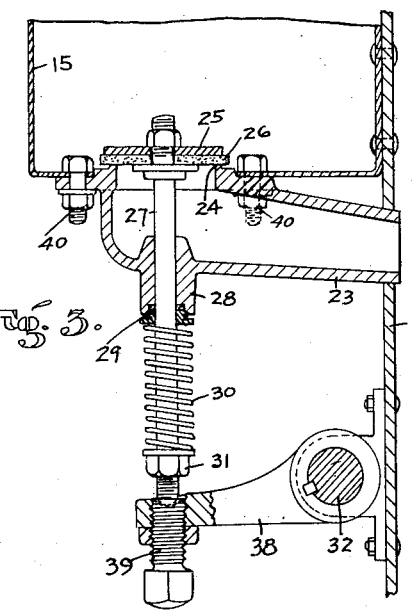
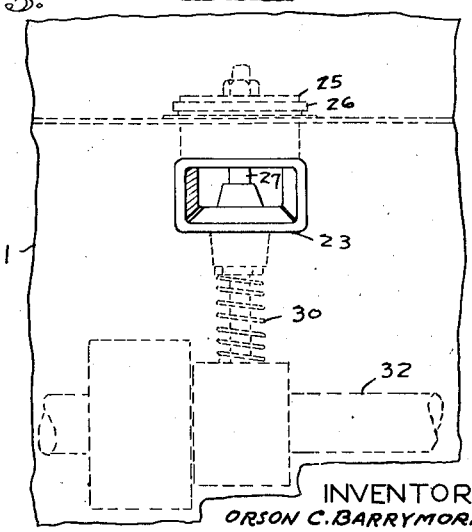
INVENTORS
ORSON C. BARRYMORE.
REGINALD A. DADDISMAN.
BY Miller & Boyken
ATTORNEYS Patented Nov. 6, 1928.

1,690,849

UNITED STATES PATENT OFFICE.

ORSON C. BARRYMORE AND REGINALD A. DADDISMAN, OF SAN FRANCISCO, CALIFORNIA, ASSIGNORS TO BARRYMORE CONCRETE MIXER CORPORATION, OF SAN FRANCISCO, CALIFORNIA, A CORPORATION OF CALIFORNIA.

CONCRETE-MIXER WATER CONTROL.

Application filed May 3, 1927. Serial No. 188,591.

This invention relates to concrete mixers of the tiltable type mounted on wagons or automobile trucks generally as shown in our joint patent filed under Serial No. 137,186 September 23, 1926, and has for its objects improvements in such mixers whereby the water introduced to the concrete may be better controlled and the operation of the apparatus be more reliable.

In the drawings forming part of this application, Fig. 1 is a side elevation of our concrete mixer as tiltably mounted on the chassis frame of a motor truck. Fig. 2 is a view of the front end of the mixer. Fig. 3 is an enlarged cross section of one of the water valves and inlets from the water tank. Fig. 4 is a plan view of Fig. 3. Fig. 5 is a side view of Fig. 3. Fig. 6 is an enlarged vertical section of the air valve on the water tank.

The mixer comprises a sheet metal open top trough or mixer body 1 supported on a frame 2 and pivoted adjacent its rear end at 3 to brackets 4 secured to the chassis frame 5 of the motor truck. The mixer rests when in horizontal position on members 6 and is adapted to tilt upward at its forward end as indicated by the dotted arc by means of any suitable truck body dumping mechanism not forming part of this invention and therefore omitted from the drawings.

At the forward end of the mixer is a gear casing 7 covering the mixer operating gears carried on the mixer and actuated by means of a drive clutch member 8 slidably projecting from the winch take-off of the gear transmission 10 of the truck, the clutch member 8 being adapted to engage a complimentary clutch member 11 projecting from the gearing of the mixer within the housing upon operating the lever 12.

At the rear end of the mixer body or trough is a discharge gate 13 operated from the forward end by a rod at each side of the trough as at 14, while along both sides of the trough are elevated water-tanks 15 adapted to carry a sufficient supply of water for a charge of dry concrete material in the trough.

These tanks are cross connected by a lower pipe 16 for simultaneous filling and emptying, and an upper cross connected pipe 17 is provided for common venting through a special valve 18 on the forward end of one of the tanks and both tanks are filled through a filling plug 19 mounted on the rearward end of one of the tanks, it being understood that the tanks are closed on top.

Valve 18 comprises a tubular cage 20 screwed into the tank 15, the cage being cross slotted at its lower end at 20; and within the cage is a hollow rubber ball 21 adapted to rise when the water level reaches it and to choke off the air vent 22 and thus prevent water from overflowing after the air has freely escaped through the valve in filling the tanks.

To admit the water from the tanks to the mixer trough a plurality of nozzles 23 extend from the bottom of the water tanks into openings formed in the side wall of the trough 1 and each nozzle forms the body of a valve provided with a seat 24 opening upwardly just within the bottom of the tank 15 and upon which rests a circular valve head 25 faced with a gasket washer 26, all carried on a vertically slidable stem 27 supported in a boss 28 formed on the nozzle 23 preferably as an integral casting, and which boss carries a stuffing box 29 for keeping the stem tight while permitting sliding action, while a compressing spiral spring 30 surrounding the stem and reacting between the stuffing box and a nut 31 on the stem serves to normally hold the valve seated so that water cannot escape from the tanks to the mixer trough.

To operate the valves we mount along opposite sides of the trough a pair of rock shafts 32 connected together for simultaneous motion by cranks 33 and a rod 34 extending through the gear casing 7 adjacent the forward end of the trough, as best indicated in Fig. 2.

One of the shafts is provided with another crank 35 linked at 36 to a forwardly projecting lever 37 pivotally supported on the forward end of the trough so that by lifting the lever both shafts will be revolved a fractional turn.

Under each valve an arm 38 is secured to the adjacent shaft and an adjustable cup-end set-screw 39 is provided at the end of each arm to receive each the lower end of one of the valve stems 27. Thus when the shafts are rocked by the lever 37 the arms 38 will lift and open the valves to admit water to the trough through nozzles 23, and the setscrews 39 provide for adjustment to insure tight closing of the valves.

If it is desired to renew the valve washers, the entire nozzle assembly easily unbolts from the bottom of the tank by loosening bolts 40 so that the nozzle, valve, seat, stem and spring all come away as a unit.

We claim:—

1. A concrete mixer comprising a mixing trough, an elevated water tank secured to the trough, and a discharge nozzle leading from the tank through an opening in the trough for admission of water thereto, a valve seat on said nozzle, a valve on said seat provided with a steam extending through an opening in said nozzle, and means for operating said stem and its valve.

2. A concrete mixer comprising a mixing trough, an elevated water tank secured to the trough, and a discharge nozzle leading from the tank through an opening in the trough for admission of water thereto, a valve seat on said nozzle, a valve on said seat provided with a stem extending through an opening in said nozzle, a pivotally mounted crank arm arranged adjacent said stem for moving the same for lifting the valve, spring means for normally closing said valve, and manually operable means for moving said crank arm for opening said valve.

3. A concrete mixer comprising a mixing trough, an elevated water tank secured to the trough, and a discharge nozzle leading from the tank through an opening in the bottom of the tank, a valve seat formed on said nozzle adjacent the bottom of the tank, a stem valve seated thereon with its stem projecting through an opening in said nozzle, a spring on said stem for holding the valve closed, and means for manually opening said valve by pressure against said stem.

4. A concrete mixer comprising a trough, a pair of water tanks on the upper portion of said trough, means for admitting water from the tanks to said trough comprising a plurality of nozzles extending from the tanks through the sides of the trough, valves on said nozzles, rock shafts mounted on opposite sides of the trough, manually operated means for simultaneously rocking said shafts, means on said shafts for operating the valves upon rocking of the shafts.

5. In a structure as specified in claim 3 said nozzle being attached to the bottom of said tank for easy removal to come away complete with seat, valve, stem and spring, 6. In a concrete mixer, a water tank therein closed on all sides, means for admitting water to said tank, means for discharging the water therefrom, and an air valve on the top of said tank comprising a tubular cage extending into the tank from the top thereof provided with an air vent and being apertured at its lower end and sides, a buoyant ball within said cage adapted to float upon a rising water level and close said air vent.

7. In a structure as specified in claim 4 said last mentioned means comprising arms secured to the shafts, and adjusting screws at the ends of the arms bearing against the valves.

ORSON C. BARRYMORE.
REGINALD A. DADDISMAN.